Jan. 1, 1929.
C. T. WALLIS
1,697,580
SPEEDOMETER
Filed Aug. 30, 1927
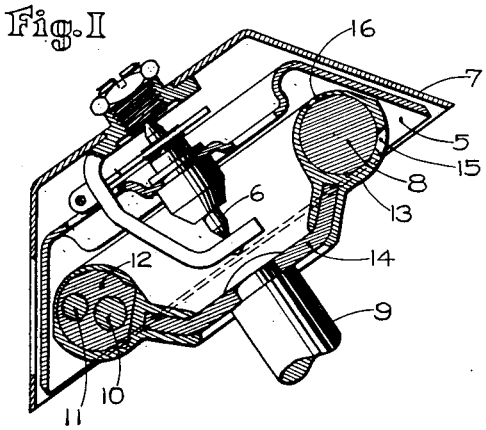
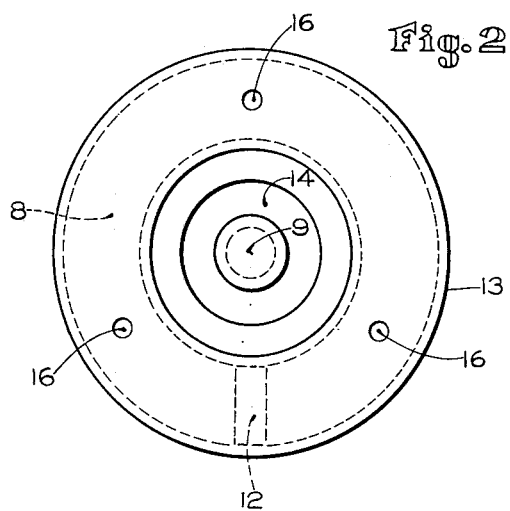
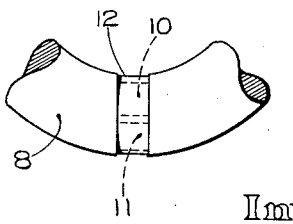
Inventor
Cyril T. Wallis
by his attorney
Farnum F. Dorsey Patented Jan. 1, 1929.

1,697,580

UNITED STATES PATENT OFFICE.

CYRIL T. WALLIS, OF ROCHESTER, NEW YORK, ASSIGNOR TO NORTH EAST ELECTRIC COMPANY, OF ROCHESTER, NEW YORK, A CORPORATION OF NEW YORK.

SPEEDOMETER.

Application filed August 30, 1927. Serial No. 216,396.

This invention relates to speed measuring instruments, such as speedometers or tachometers, of the type in which an electrically conductive indicator is moved by the inductive effect of the field produced by a rotating permanent magnet.

In instruments of the kind in question, the magnet is commonly made in the form of an open ring, mounted upon the end of a shaft by which it is revolved. As the steel of which such magnets are made is very difficult to machine, the magnet is most conveniently made by heating and bending a suitable length of rod, and any finishing operation to which the ring is subjected can only be done conveniently by the relatively expensive method of grinding.

One object of the present invention is to provide for the mounting of such a magnet on its shaft, by simple and inexpensive means which support the magnet securely and accurately in position, without the necessity of grinding it to accurate form, while producing a symmetrical and balanced rotor. To this end it is proposed to use die-cast metal, enveloping the magnet and compensating for any slight irregularities in the form of the latter.

In an instrument of the kind in question, it is desirable to compensate for the effect of temperature changes upon the conductive material of the indicator, and this is sometimes done by interposing a magnetic shunt of suitable material between the ends or poles of the ring magnet. A further object of the present invention is to provide, in a simple and effective manner, for securing such shunt, as well as the magnet itself, in proper position and relation to the other parts. To this end it is proposed to introduce the shunt between the ends of the magnet and then envelop both the magnet and the shunt in die-cast metal, thus securing them rigidly and permanently in correct relation.

In the accompanying drawings, Fig. 1 is a sectional side elevation of the operative instrumentalities of a magnetic speedometer constructed in accordance with the present invention. Fig. 2 is an axial view, looking downwardly, of the rotor of the instrument, and Fig. 3 is a detail view showing the manner in which the compensating shunt is introduced and temporarily held between the poles of the magnet.

The invention is illustrated as embodied in a speedometer having an indicator 5 of the general form of a truncated cone. This indicator is supported, in the usual manner, upon a pivot staff 6. It is enclosed within a conical steel member 7, constituting a part of the path for the magnetic flux. While the form and arrangement of these parts, as illustrated, involve some novel and patentable features, they are not claimed herein, as they are disclosed and claimed in my application filed June 28, 1926, Serial No. 119,070.

The magnet 8 is shown in the form of a ring, made by bending a round rod of magnet steel. The ends or poles of this ring are separated by a suitable space, the faces of the ends being preferably made flat and at the required distance by a grinding operation, in the usual manner. This magnet is mounted at the upper end of an inclined shaft 9, coaxial with the pivot staff 6, and it will be understood that this shaft is rotated by connection with the machinery by which the speed is to be measured.

While this is not essential to the invention, the compensating shunt is, in this case, illustrated as comprising two slugs 10 and 11, respectively, made of alloys having different temperature-permeability characteristics. As a convenient means for holding these slugs temporarily in place, a small die casting 12 is used, this casting having two openings fitting the slugs, and into which they may be pressed so as to be held frictionally, This casting 12 is then introduced between the ends of the magnet 8, being itself held in place frictionally by the resiliency of the magnet. The magnet, with its compensating means, is then introduced into a suitable die-casting mould, adapted to produce the casting 13 shown in cross-section in Fig. 1. In the center of the casting an insert 14 is used, this insert being formed of non-magnetic sheet metal, and being centrally perforated. After the casting has been completed the magnet, the compensator and the center plate 14 are all held rigidly in correct relative position, while the external surface of the casting is smooth and symmetrical, regardless of irregularities in the form of the magnet, thus producing a rotor which has correct balance and which may be assembled with the other parts of the instrument with a minimum air gap or clearance. The thickness of die-cast metal should be at a minimum at the zone of closest approximation of the magnet to the indicator, as shown in Fig. 1, and this result is secured by locating the magnet within the mould at three points, by means of the supports commonly used for such purposes. These supports produce the depressions 15 and 16 in the upper and lower surfaces of the casting, as shown in the drawings.

While it is possible to connect the magnet with the shaft 9 directly, by means of the die-cast metal itself, the center plate 14 is preferably used for this purpose, since, being of harder and stronger material, it may have a minimum thickness and thus occupy a minimum axial space in the instrument, as is desirable in order to provide the greatest practicable length of pivot staff and shaft bearing.

The invention claimed is:

1. In a speedometer, the combination of a permanent magnet, a shaft for revolving the magnet, a magnetic compensating shunt interposed between the poles of the magnet, and a mass of non-magnetic cast metal enveloping the magnet and the shunt and fixed to the shaft.

2. In a speedometer, the combination of a permanent magnet in the form of an open ring, a perforated center-plate coaxial with the magnet, and a mass of non-magnetic cast metal enveloping the magnet and the marginal portion only of the center plate.

3. In a speedometer, the combination of a permanent magnet, a body of non-magnetic material, provided with a recess, located between the poles of the magnet, a compensating shunt in said recess, and means for supporting the magnet comprising a mass of non-magnetic cast metal enveloping the magnet and said body and compensating shunt.

CYRIL T. WALLIS.